United States Patent [19]

Luck et al.

[11] 4,277,428
[45] * Jul. 7, 1981

[54] POST-PRESS MOLDING OF MAN-MADE BOARDS TO PRODUCE CONTOURED FURNITURE PARTS

[75] Inventors: Allan J. Luck, Harvard; John T. Clarke; Roger F. Sutton, both of St. Charles, all of Ill.

[73] Assignee: Masonite Corporation, Chicago, Ill.

[*] Notice: The portion of the term of this patent subsequent to Nov. 20, 1996, has been disclaimed.

[21] Appl. No.: 95,627

[22] Filed: Nov. 19, 1979

Related U.S. Application Data

[63] Continuation-in-part of Ser. No. 833,037, Sep. 14, 1977, Pat. No. 4,175,106.

[51] Int. Cl.³ .............................................. B29J 5/00
[52] U.S. Cl. .................... 264/118; 264/119; 264/120; 264/320
[58] Field of Search ................ 264/119, 118, 120, 320

[56] References Cited

U.S. PATENT DOCUMENTS 4,175,106  11/1979  Luck et al. ................. 264/118

Primary Examiner—Donald E. Czaja
Assistant Examiner—James R. Hall
Attorney, Agent, or Firm—Mason, Kolehmainen, Rathburn & Wyss

[57] ABSTRACT

Multi-sided decorative moldings and furniture parts are manufactured by drying or hot-pressing a cellulosic fiber-containing mat to consolidate said mat into a unitary blank, cutting the blank to a size larger than interior dimensions of a closed mold in each of its three dimensions and with at least two generally shaped or profiled edge surfaces disposed between a top surface and a bottom surface of the blank. The cut blank is then molded at a temperature of at least 200° F. for a period of time sufficient to permanently transfer the interior shape and design of the mold cavity to every surface of the blank.

16 Claims, 5 Drawing Figures

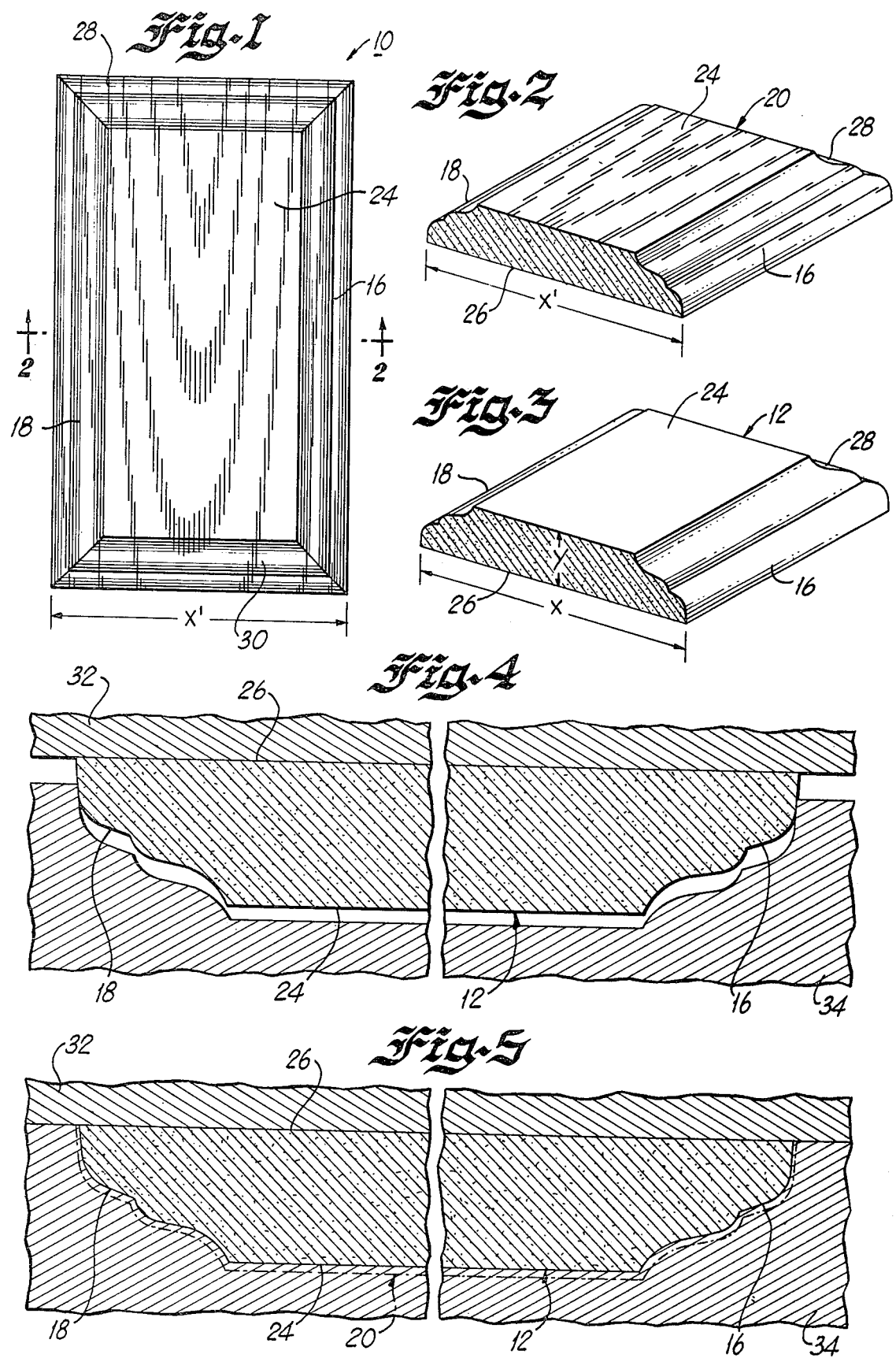

POST-PRESS MOLDING OF MAN-MADE BOARDS TO PRODUCE CONTOURED FURNITURE PARTS

CROSS REFERENCE TO RELATED APPLICATIONS

This application is a continuation-in-part of Ser. No. 833,037 filed Sept. 14, 1977, now U.S. Pat. No. 4,175,106.

BACKGROUND OF THE INVENTION

1. Field of the Invention

The present invention relates to a method of molding man-made boards to produce contoured furniture parts. More particularly, the present invention relates to a method of molding a man-made board to produce contoured furniture or decorative parts, such as a drawer front, cabinet door, table top, and the like. A fiberboard or particle board blank is first formed and cut to a size slightly larger than interior dimensions of a mold. The cut blank can be pre-treated with a sealer, preferably including a release agent, and is then molded at a temperature of at least 200° F. to form the blank into its final shape.

The process of the present invention relates to a "post-press" or after consolidation molding operation for molding a fiberboard or particle board into a furniture part or decorative part having a desired shape. The fiberboard or particle board substrate is formed by depositing a mass of fibers onto a support member, by either a dry deposition process or wet deposition process known in the art of papermaking or fiberboard manufacture, and then consolidating the fibers by drying or under test and pressure. Typical products made by these processes are insulation board, medium density fiberboard and particle board.

The consolidated mat is first manufactured by consolidating a cellulosic fiber-containing composition to form a consolidated fiberboard or particle board. The consolidated mat can be consolidated by drying a mat formed by depositing a water slurry of fibers onto a water pervious support member, as is common in the manufacture of insulation board, or the mat can be consolidated under heat and pressure until substantially dry in a first press operation. The consolidated mat is thereafter "post-pressed" in a mold having the desired configuration to form the consolidated fiberboard into a desired shape and to impart surface texture if desired.

After board consolidation, the blank is cut from the board to a size slightly larger than interior dimensions of a mold cavity. The consolidated cut blank is thereafter "post-press molded" in a mold having a desired internal configuration to mold the consolidated fiberboard blank into a multi-sided part having a desired shape and to form a surface design corresponding to natural wood or other decorative materials, such as cork, slate and the like. For the purpose of the present invention, a "post-press molding" operation refers to a molding step performed on a consolidated man-made board which changes the dimensions of the consolidated board in all three of its dimensions.

The fiberboard of the present invention is generally formed in two separate operations. The first operation forms a consolidated man-made board of any desired density, i.e, 10–65 pounds/ft.$^3$, in a manner common in the art of forming a fiberboard, such as insulation board or medium density hardboard. The second step comprises "post-press molding" which changes the overall dimensions of the consolidated fiberboard along its length, width and height to form a multi-sided contoured board having dimensions corresponding to the dimensions of the mold cavity. It is quite surprising that a "post-press molding" operation is effective in substantially altering the dimensions of a consolidated fiberboard in all three dimensions to produce a multi-sided embossed part without visible fiber tearing or delamination.

2. Description of the Prior Art

It is very difficult to both densify and restructure the surface of a consolidated fiberboard without destroying the fiber-to-fiber surface welds referred to in this assignee's U.S. Pat. No. 4,007,076 and co-pending application Ser. No. 739,184 filed Nov. 5, 1976, now U.S. Pat. No. 4,175,150.

An article entitled "Wood Embossing Machines Cut Product Steps For 'Carved' Parts" by Bruce Scully, appearing in Furniture Design & Manufacturing, February, 1977, pages 30-33 and an article entitled "Two New Concepts in Embossing" by Darrell Ward, appearing in Woodworking & Furniture Digest, June, 1977, pages 46-50, relate to embossing materials, including fiberboard, in making furniture parts, but do not suggest molding a man-made board to produce multi-sided furniture or decorative parts as disclosed herein.

SUMMARY OF THE INVENTION

An object of the present invention is to provide a method of making decorative articles or furniture parts from man-made boards having the look, feel and sound of natural wood.

Another object of the present invention is to provide a method of making a cellulosic fiber-containing molded furniture part or decorative molding having the look, feel, and texture of natural wood or other natural or decorative materials by compressing a consolidated man-made board in all three of its dimensions in a mold at a temperature of at least 200° F.

Another object of the present invention is to provide a method of making a man-made molded board having design fidelity and paint holdout properties equal to or better than hardboards and natural wood parts manufactured in accordance with existing technology.

Another object of the present invention is to provide a method of molding consolidated man-made board blanks having a density of at least 10 pounds/ft.$^3$ at a temperature in the range of 200°–650° F.

Another object of the present invention is to provide a method of molding consolidated man-made board blanks having a density of at least 10 pounds/ft.$^3$ at a temperature in the range of 250°–650° F.

In accordance with an important feature of the present invention, the technology disclosed herein has been developed to provide a strong cellulosic fiber-containing molded product, for example, molded insulation board or particle board which has sufficient strength for end uses such as furniture parts and decorative moldings. The product is produced by first manufacturing and consolidating a fiberboard or particle board blank, then cutting the blank to a size slightly larger than interior dimensions of a mold cavity; thereafter, the consolidated, oversized blank is molded to size and shape. If the blank is manufactured having a density greater than 35 pounds/ft.$^3$, the final product will be very high strength as disclosed in our prior U.S. Pat. No. 4,175,106. It has been found herein that lower temperatures on the order of 200° F. to 500° F., and especially 250° F. to 500° F. can be used to mold lower density blanks, i.e. 10-35 pounds/ft.$^3$ while achieving accurate reproduction of the design of the mold cavity onto the board surfaces, although higher temperatures of 500°-650° F. can also be used in molding the lower density blanks. It has been found that the lower temperatures of 200°-500° F. can also be used to post-press mold the higher density blanks (greater than 35 pounds/ft.$^3$) with some sacrifice in design fidelity.

In accordance with the present invention, it has been found that the configuration, surface density, and physical characteristics of a completely consolidated fiberboard or particle board blank can be altered in a "post-press molding" operation when the mold is heated to a temperature of at least 200° F. During the "post-press molding" operation, at a temperature of at least 200° F., a consolidated cellulosic fiberboard or particle board substrate is strengthened in an amount necessary for the product to be useful as a furniture part while, at the same time, the board is restructured in all three of its dimensions to a desired configuration. The resulting product has a look, feel, sound and can have a density equivalent to that of natural wood, while being produced at a much lower cost. In accordance with one embodiment disclosed herein, relatively light consolidated blanks are molded to produce lightweight molded furniture parts or decorative products by molding consolidated mats having a density less than about 35 pounds/ft.$^3$ and generally in the range of 10-35 pounds/ft.$^3$.

The lightweight handleable mat which is post-press molded in accordance with one embodiment of the present invention is manufactured in a conventional manner, using conventional cellulosic fiber stock. To achieve a lightweight product, the handleable mat should have a density, after consolidation, in the range of about 10-35 pounds per cubic foot, preferably in the range of 15-30 pounds/cubic foot. Panels of varying thicknesses having densities within this range can be produced in accordance with known technology to provide lightweight blanks to be shaped and molded in accordance with one embodiment of the present invention.

Handleable mats have been produced having a density as low as ten pounds per cubic foot and a thickness of one and one-half inches. Mats having densities as low as ten pounds per cubic foot are useful as the handleable mat in producing lightweight molded products in accordance with the principles of the present invention. Any low density mat (less than 35 pounds per cubic foot) is considered to be handleable if it can survive the trimming, cutting, stacking, packing, shipping and unloading operations necessary to produce fiberboard. All such handleable mats are useful in accordance with the principles of the present invention and can be shaped and molded at a temperature in the range of 200°-650° F.

In accordance with a second embodiment of the present invention, heavier fiberboard or particle board consolidated mats having densities of at least 35 pounds/ft.$^3$, i.e. 35-65 pounds/ft.$^3$ can be shaped and molded in accordance with the present invention. The heavier fiberboard or particle board consolidated mats also are manufactured in a conventional manner using conventional cellulosic fiber stock. Fiberboard or particle board consolidated panels having a density of 35-65 pounds/ft.$^3$ can be produced in accordance with known technology and thereafter shaped and molded in accordance with the present invention. The higher density consolidated mats are then post-press molded at a temperature in the range of 200°-650° F. To achieve the full advantage of the present invention the higher density blanks having a density of at least 35 pounds/ft.$^3$ should be molded at a temperature of 400°-650° F.

The method of producing a consolidated mat is well known as presently used in producing man-made boards such as hardboard, chipboard, particle board, panelboard, acoustical board, insulation board, and the like. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is then dryed to consolidate, as in the manufacture of insulation board, or can be transferred from the pervious support member and consolidated under heat and pressure to form the board. Typically, pressures of from 400 to 500 psi and temperatures up to about 400° F. are encountered in hot-press consolidation of a man-made board manufactured by the wet process. The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 psi to cure the thermosetting resin and to compress the mat into an integral consolidated structure.

To manufacture furniture parts from man-made boards, the molded blank is oversized in each of its three dimensions. In this manner, sufficient pressure will be imparted to all surfaces of the blank, during molding, to provide enough heat transfer from the mold to the blank to effect accurate reproduction of the details of the mold cavity into all surfaces of the molded product. It may not be necessary to emboss or finish (stain) one or two sides of the product because of the positioning of a particular furniture part with respect to other parts or with respect to surrounding walls, such as with shelving material. It is always necessary, however, for the blank to be oversized in all three of its dimensions to provide design fidelity and paint holdout properties to the remaining sides. Accordingly, while the product of the present invention may be finished on only four or five of its six sides, it is always necessary to compress the pre-mold blank in all of its three dimensions to provide a furniture part having an embossed design and excellent paint hold-out properties on all of its visible sides. "Design fidelity" or simply "fidelity" as used herein is a measure of the accuracy of reproduction of the design of an embossing mold onto the surfaces of a consolidated blank. "Paint holdout" is the ability of a panel or board to keep paint on its surface without a significant amount striking into the panel.

BRIEF DESCRIPTION OF THE DRAWING

FIG. 1 is an elevational view of the front of a furniture part manufactured in accordance with the present invention.

FIG. 2 is a cross-sectional, perspective view of a molded, shaped furniture part taken along the line 2—2 of FIG. 1 molded from the blank of FIG. 3 in accordance with the present invention.

FIG. 3 is a cross-sectional, perspective view of an oversized, shaped, pre-mold blank which is molded, as shown in FIGS. 4 and 5 to produce the part shown in FIG. 2.

FIG. 4 is a cross-sectional view of the oversized blank as it is forced into the mold along tapered edges.

FIG. 5 is a cross-sectional view of the closed mold during molding of the blank of FIG. 3 and shows the pre-molded shape of the blank in broken lines.

DETAILED DESCRIPTION OF THE INVENTION

The man-made blank is manufactured in accordance with known technology in producing consolidated fiberboards or particle boards. Typical man-made boards useful for molding in accordance with the present invention have a density in the range of about 10 to about 65 pounds/cubic foot. Typical examples are insulation board having a density of about 17 pounds/ft.$^3$ and medium density fiberboard having a density of about 44 pounds/cubic foot. The fiberboard blank is consolidated by drying a water laid mat, such as with insulation board, or by hot-pressing under heat and pressure in a first press operation, such as with fiberboard or hardboard, as known in the art.

Prior to molding the consolidated blank to a desired shape and surface design, the blank is first cut or routed to a size and shape generally corresponding to the size and shape of a mold cavity, but slightly larger in each of its three dimensions. With higher density blanks on the order of 35–65 pounds/ft.$^3$, the blank is oversized a maximum of about 15–20% (i.e. 3/32 inch) while achieving good design fidelity. With lower density blanks on the order 10–35 pounds/ft.$^3$, the blank can be oversized as much as about 40%, preferably no more than about 30%, while achieving good design fidelity. In this manner, when the oversized blank is inserted into the mold cavity and the mold closed, pressure will be exerted on the blank along every side to compress the blank to a size corresponding to the size of the mold cavity. Oversizing the blank is necessary so that the mold embossing plates will exert enough pressure on the blank when the mold is closed for accurate transfer of the details of the interior surface of the mold cavity and for proper heat transfer to each blank surface wherein a surface design and/or surface coloration is desired.

To achieve the full advantage of the present invention, the blank is cut slightly larger than the finished part on all surfaces so that the finished part can be embossed within the mold on all sides. To achieve the full advantage of the present invention, the blank is shaped, such as by using a router or shaper, to about the same profile as the finished part to assure that about equal pressure is applied in the mold and to assure uniform heat transfer to the molded surfaces. For example, in making a drawer front such as that shown in the drawing, a medium density consolidated fiberboard having a density of 44 pounds/ft$^3$ was cut to form a blank having dimensions 15 1/16"×7 9/16"×0.0800". The dimensions of the mold cavity and final part were 15"×7½"×0.750".

The size of the blank is somewhat dependent upon the density of the blank—the lower the blank density, the greater can be the oversizing of the blank. A blank having a density of about 35 pounds/ft.$^3$ or higher can be cut to about 15% oversize along its thickness dimension, and oversized to the mold length and width by about 1/16".

A mold lubricant or sealer can be applied to the surfaces of the blank prior to molding. The sealer aids in hardening the molded surfaces, increasing paint holdout, and can include a releasing agent such as polydimethylsiloxane to aid in removing the finished part from the mold. Typical mold lubricants are, for example, acrylic polymers, such as Lilly Prepress Sealer 73-035, and the like. Any lubricant, sealer or releasing agent can be applied to the oversized blank prior to molding so long as the additive can withstand the high molding temperature.

Various blanks of different densities in the range of 10–35 pounds/ft.$^3$ were molded at temperatures in the range of 250°–500° F. and it was found that the molded boards had excellent paint holdout and design fidelity characteristics when restructured by molding to the size and shape of the mold cavity. Table I shows the various blank and final product specifications:

TABLE I

| | BLANK | | PRODUCT | |
|---|---|---|---|---|
| Example | Thickness (inch) | Density (lb/ft.$^3$) | Thickness (Inch) | Density (lb/ft.$^3$) |
| 1 | 1.0 | 17.1 | .76 | 22.5 |
| 2 | 1.1 | 17.1 | .76 | 24.8 |
| 3 | .95 | 25 | .764 | 31.1 |
| 4 | .90 | 30 | .766 | 35.2 |
| 5 | .85 | 35 | .733 | 38.4 |

The blanks of Examples 1 and 2 were cut from insulation board having a density of about 17 pounds/ft.$^3$ and were cut to size and the edges were preshaped as shown in FIG. 3. An acrylic mold lubricant was sprayed onto the blank surfaces prior to molding in an amount of about 2 grams solids per square foot of surface area. Each blank of Examples 1 and 2 was pressed at a temperature of 200° F., 250° F., 300° F., 350° F., and 400° F. with excellent design fidelity.

The blanks of Examples 3, 4 and 5 were cut from consolidated fiberboards having the indicated densities and were cut to size and the edges were shaped as shown in FIG. 3. The final size of all blanks from Examples 1–5 was 7.30 inches by 15.10 inches. An acrylic mold lubricant was sprayed onto the blank surfaces prior to molding in an amount of about 2 grams solids per square foot of surface area. The blanks indicated in Examples 3, 4 and 5 were pressed at temperatures of 400° F., 450° F., and 500° F. with excellent design fidelity.

MOLDING CONDITIONS

A consolidated blank is "molded" at a temperature of at least 200° F. To achive the full advantage of the present invention, the temperature of "molding" should not exceed 650° F. To achieve the full advantage of the present invention, the higher density blanks with densities of at least 35 pounds/ft.$^3$ should be molded at a temperature of at least 400° F. although temperatures of 250°–400° F. provide adequate design fidelity. It is preferred to mold the higher density blanks of at least 35 pounds/ft.$^3$ at a temperature in the range of 525°–575° F. As shown in the drawing, a molded contoured drawer front, indicated generally by reference numeral 10 is molded from a consolidated blank 12. The consolidated blank 12 is pre-shaped, as indicated generally in FIG. 3. The lower density blanks with densities up to about 35 pounds/ft.$^3$ can be molded in the temperature range of 200°–650° F. although at least 250° F. should be used to achieve the best design fidelity.

Each blank must be larger than the dimensions of the mold cavity in each of its three dimensions to provide accurate transfer of the details of the mold and excellent paint holdout to all surfaces of the blank 12. The blank 12 of FIG. 3 has been shaped by routing along its opposing side edges 16 and 18 to provide a width (x-dimension) which is larger than the x' dimension in the corresponding finished part 20 (FIG. 2).

Both of the major surfaces, top surface 24 and bottom surface 26, are oversized. It is important that all three dimensions of a three dimensional part are oversized prior to molding to achieve the compression and heat transfer necessary to impart embossing details and paint holdout properties to all surfaces. As shown in FIG. 4, a shaped blank 12 is molded by compressing top mold portion 32 onto bottom mold portion 34 to force blank 12 into the mold and to form the shape of the molded part to correspond to the dimensions of the mold cavity.

At least two, and preferably all four, of the side and end edges 16 and 18, 28 and 30 should be generally tapered, as shown in the drawing, from one major surface, i.e. 24, to the other major surface i.e. 26 so that during molding, the top mold portion 32 can close in contact with bottom mold portion 34, thereby forcing the oversized blank 12 into the mold cavity. However, it should be recognized that moving mold walls could eliminate this requirement. With stationary mold walls, one major surface, i.e. 24, must be smaller than the other major surface to allow for at least two generally tapered edges 16, 18, 28 and 30 so that the oversized blank 12 can be wedged into the mold cavity without tearing the fibers of the consolidated blank. It is quite surprising that a consolidated blank, oversized in all three dimensions, can be forced into a smaller mold cavity and thereby have its dimensions changed in every direction without surface fiber tearing. It has been found that a temperature of at least 200° F. and at least two generally tapered side or end edges are necessary to prevent surface fiber tearing during molding when the mold has stationary edge walls. With generally tapered edges and a mold temperature of at least 200° F., a blank having a density of at least 35 pounds/ft.$^3$ can be oversized as much as about 15–20% (i.e. 1/16–3/32") without surface fiber tearing, while obtaining sharp, crisp transference of the details of the mold cavity into all surfaces of the molded product. The lower density blanks having densities in the range of 10–35 pounds/ft.$^3$ can be oversized as much as 40% without surface fibers tearing.

The shaped blank is molded at a temperature of at least 200° F., and for blanks having a density of at least 35 pounds/ft.$^3$, a range of 400°–650° F. is most effective. An exact reproduction of the design of the mold cavity is imparted to the shaped blank on each oversized surface. An example of a typical molding cycle for small parts is as follows: the blank is loaded into the mold having a temperature of 550° F. in 4 seconds: the mold is brought up to 500 psi in 11 seconds and held at full temperature and pressure for 30 seconds: 10–15 seconds are required to relieve the pressure and 5 seconds are required to remove the finished part. In all, therefore, it requires one minute to mold a six-sided furniture part using the method of the present invention.

Although the present invention has been described with reference to a particular shaped drawer front as shown in the drawings, it should be understood that numerous other modifications and embodiments can be devised by those skilled in the art that will fall within the spirit and scope of the principles of this invention.

What is claimed as new and desired to be secured by Letters Patent of the United States:

1. A method of molding a cellulosic fiber containing board to form a three dimensional contoured part comprising:
   (a) compressing and heating a fibrous mass of cellulosic fibers to bond the fibers into a consolidated blank;
   (b) cutting the consolidated blank to a size larger than the interior dimensions of said mold cavity in each of its three dimensions;
   (c) inserting said cut blank in the open cavity of said contoured mold;
   (d) closing said mold;
   (e) hot-pressing said consolidated, cut blank in said mold at a temperature of 200° F. to 650° F. to form a contoured, molded product; and
   (f) opening said mold and removing said molded, contoured part.

2. A method as defined in claim 1 wherein step (e) is carried out at a temperature of 400°–575° F.

3. A method of forming a molded furniture part from a pre-formed cellulosic blank to form a multisided contoured part, comprising:
   (a) cutting said pre-formed consolidated blank to a size larger, in each of its three dimensions, than corresponding interior dimensions of a contoured closed mold cavity;
   (b) forming said consolidated blank with a plurality of generally tapered edges so that a portion of said blank will extend into said mold cavity, without force; and
   (c) inserting said cut blank into said mold;
   (d) closing said mold to cause said blank to conform to the contoured cavity of said mold and to reduce the size of said blank along all three dimensions, and to transfer details of said contoured mold cavity to the surface of said blank.
   (e) heating said closed mold to a temperature of 200° F.–650° F.; and
   (f) opening said mold and removing said contoured furniture part.

4. A method as defined in claim 3 wherein step (e) is carried out at a temperature of 500°–650° F.

5. A method of manufacturing a three dimensional, multi-sided part comprising:
   (a) pressing a cullulosic fiber-containing mat to consolidate said mat into a unitary blank;
   (b) cutting said blank to a size larger than interior dimensions of a closed mold in all three dimensions;
   (c) inserting said cut blank into the open cavity of said contoured mold;
   (d) closing said mold;
   (e) hot pressing said unitary cut blank in said mold at a temperature of 200° F. to 650° F. for a period of time sufficient to permanently transfer the interior shape and design of the mold cavity to every surface of said blank and to re-shape said blank in all three dimensions; and
   (f) opening said mold to remove said three-dimensional, multi-sided part.

6. A method as defined in claim 5 wherein step (e) is carried out at a pressure not exceeding 750 p.s.i.

7. A method as defined in claim 5 wherein step (e) is carried out at a pressure of 30–700 p.s.i.

8. A method as defined in claim 7 wherein step (e) is carried out at a pressure of 100-500 p.s.i.

9. A method as defined in claim 7 wherein said mold includes a vent plate for the escape of gases formed in said mold.

10. The method of claim 1 wherein said three dimensional contoured part is a six-sided part.

11. A method of molding a cellulosic fiber containing board to form a six-sided contoured part comprising:
   (a) compressing a fibrous composition, including cellulosic fibers, under heat and pressure to form a consolidated blank;
   (b) shaping the consolidated blank to generally correspond to a shape of a mold cavity wherein said shaped blank is slightly larger than said mold cavity in each of its three dimensions; and
   (c) inserting said shaped blank, having a plurality of generally tapered edges, into said mold, and closing said mold to compress said shaped blank at a temperature in the range of 200° F.-650° F. to change the dimensions of said shaped blank to correspond with the dimensions of said mold cavity.

12. A method as defined in claim 5 wherein said blank is molded at a temperature in the range of 200°-400° F.

13. A method as defined in claim 5 wherein said blank is molded at a temperature in the range of 400°-500° F.

14. A method as defined in claim 5 wherein said blank is molded at a temperature in the range of 400°-650° F.

15. A method as defined in claim 5 wherein said blank is molded at a temperature in the range of 250°-500° F.

16. An embossed, molded, decorative, three-dimensional multi-sided cellulosic product comprising a fiberboard or particle board substrate and a binder formed by depositing fibers including cellulosic fibers, onto a support member and consolidating said fibers under pressure to form a consolidated blank and thereafter molding said blank, having dimensions greater than dimensions of a mold cavity in each of its three dimensions, under pressure, at a temperature in the range of 200° F. to 650° F. to provide a hardened embossed surface to said molded product.

* * * * *